United States Patent
Durand et al.

(10) Patent No.: US 11,293,777 B2
(45) Date of Patent: Apr. 5, 2022

(54) AID METHOD FOR CONTROLLING THE ENERGY SITUATION OF AN AIRCRAFT, ASSOCIATED COMPUTER PROGRAM PRODUCT AND AID SYSTEM FOR CONTROLLING

(71) Applicant: THALES, Courbevoie (FR)

(72) Inventors: Geoffrey Durand, Toulouse (FR); Johan Boyer, Toulouse (FR)

(73) Assignee: THALES, Courbevoie (FR)

( * ) Notice: Subject to any disclaimer, the term of this patent is extended or adjusted under 35 U.S.C. 154(b) by 72 days.

(21) Appl. No.: 16/007,981

(22) Filed: Jun. 13, 2018

(65) Prior Publication Data
US 2018/0370645 A1 Dec. 27, 2018

(30) Foreign Application Priority Data

Jun. 22, 2017 (FR) .................................. 1700669

(51) Int. Cl.
| | |
|---|---|
| *G01C 23/00* | (2006.01) |
| *B64D 43/00* | (2006.01) |
| *B64D 31/04* | (2006.01) |
| *G08G 5/00* | (2006.01) |
| *G08G 5/02* | (2006.01) |
| *G05D 1/06* | (2006.01) |

(52) U.S. Cl.
CPC ........... *G01C 23/005* (2013.01); *B64D 31/04* (2013.01); *B64D 43/00* (2013.01); *G05D 1/0676* (2013.01); *G08G 5/0021* (2013.01); *G08G 5/0039* (2013.01); *G08G 5/025* (2013.01)

(58) Field of Classification Search
CPC ...... B64D 31/04; B64D 43/00; G01C 23/005; G05D 1/0676; G08G 5/0021; G08G 5/0039; G08G 5/025
See application file for complete search history.

(56) References Cited

U.S. PATENT DOCUMENTS

| | | | |
|---|---|---|---|
| 4,750,127 A | 6/1988 | Leslie et al. | |
| 9,815,571 B1 * | 11/2017 | Ogden | ................... B64D 43/00 |
| 2006/0004496 A1 | 1/2006 | Tucker et al. | |

(Continued)

OTHER PUBLICATIONS

Amelink et. al., "Theoretical Foundations for a Total Energy-Based Perspective Flight-Path Display," The International Journal of Aviation Psychology, vol. 15, pp. 205-231, Jan. 1, 2005.

(Continued)

*Primary Examiner* — Aaron L Troost
(74) *Attorney, Agent, or Firm* — Soquel Group LLC

(57) ABSTRACT

An aid method for controlling the energy situation of an aircraft. The method includes determining (i) an energy meeting point corresponding to a constraint point, (ii) a meeting type based on the constraint at the constraint point, (iii) an energy state of the aircraft relative to a reference altitude profile determined by a flight management system, (iv) a high-energy joining profile representative of a future path of the aircraft with an energy dissipation strategy, and (v) energy deviations relative to the high-energy joining profile. Determining the high energy joining profile is carried out backwards depending on the type of meeting and the energy state of the aircraft. The energy deviations are displayed to an operator of the aircraft.

18 Claims, 5 Drawing Sheets

(56) References Cited

U.S. PATENT DOCUMENTS

| | | | |
|---|---|---|---|
| 2008/0215196 A1* | 9/2008 | Deker | G05D 1/0638 |
| | | | 701/5 |
| 2008/0262665 A1 | 10/2008 | Coulmeau et al. | |
| 2011/0077858 A1 | 3/2011 | Coulmeau et al. | |
| 2012/0277936 A1* | 11/2012 | Kumar Mn | G05D 1/0676 |
| | | | 701/16 |
| 2015/0260525 A1* | 9/2015 | Parthasarathy | G08G 5/0039 |
| | | | 701/538 |
| 2015/0262490 A1* | 9/2015 | Deker | G08G 5/0047 |
| | | | 701/3 |
| 2016/0085239 A1* | 3/2016 | Boyer | G05D 1/0676 |
| | | | 701/5 |
| 2016/0275800 A1 | 9/2016 | Boulle et al. | |
| 2018/0273200 A1* | 9/2018 | De Villele | G08G 5/0091 |

OTHER PUBLICATIONS

French Patent Application 17 00669, Rapport de Recherche Preliminaire Partiel, dated Mar. 6, 2018, 7 pages.

* cited by examiner

AID METHOD FOR CONTROLLING THE ENERGY SITUATION OF AN AIRCRAFT, ASSOCIATED COMPUTER PROGRAM PRODUCT AND AID SYSTEM FOR CONTROLLING

FIELD OF THE INVENTION

The present invention relates to an aide method for controlling the energy situation of an aircraft.

The present invention also relates to an associated computer program product and aid system.

BACKGROUND OF THE INVENTION

In the state of the art, it is known to use flight management systems (FMS) to determine a theoretical descent profile of an aircraft.

This theoretical profile, also called reference profile, generally comprises a component forming a speed profile and a component forming an altitude profile of the aircraft. These components are determined in an optimized manner in particular based on the performance of the aircraft and respecting all of the constraints contained in the selected arrival procedure.

The theoretical profile therefore constitutes a reference guaranteeing that the aircraft, if the slaving on this profile is done, arrives in a suitable configuration to guarantee landing in a so-called "stabilized" manner, i.e., with an energy allowing safe landing.

This suitable configuration in particular determines the energy situation of the aircraft at several predetermined points of its trajectory that are called energy meeting points. At each of these points, the energy situation of the aircraft is defined by its speed and its altitude, which must then be respected by the aircraft in order to allow the landing.

When the aircraft follows the theoretical profile, the compliance with these energy constraints is therefore provided by the flight management system.

However, for various reasons (air traffic control, weather, poor performance modeling, etc.), the aircraft may find itself outside its theoretical profile, which sometimes makes it difficult to comply with energy constraints on the energy meeting points.

To offset these difficulties, different solutions are traditionally used in the state of the art.

One of these solutions consists of displaying a message for the pilot indicating an excessive energy situation when action is necessary by the pilot to comply with an energy constraint. This action may for example include deploying air brakes or any other change in the aerodynamic configuration of the aircraft. The monitored energy constraint not being able to be modified by the pilot, this solution may provide irrelevant information, which leads to a risk of too much information in the cockpit.

Another solution proposes to the pilot to activate a function referred to as "vertical direct to", allowing the aircraft to go directly to an energy meeting point.

However, these existing solutions do not allow the pilot or any other operator piloting the aircraft to anticipate the need to activate an energy dissipation means early enough, which leads to a risk of non-coherence with the choice of the strategy actually used by the pilot to guide the aircraft.

SUMMARY OF THE INVENTION

The present invention aims to aid the pilot or any other operator in complying with the energy constraints while allowing him to make his actions to dissipate energy compatible with his choice of strategy actually used to guide the aircraft, without creating a situation generating too much information in the cockpit.

To that end, the present invention relates to an aid method for controlling the energy situation of an aircraft, the energy situation being defined by the altitude and the speed of the aircraft.

The method includes the following steps:
determining an energy meeting point corresponding to a point of a flight plan of the aircraft, called constraint point, having an altitude constraint and/or a speed constraint;

for the determined energy meeting point:
determining a type of meeting based on the constraint at the constraint point, each type of meeting being chosen from the group consisting of: altitude meeting, speed meeting and mixed meeting;
determining an energy state of the aircraft relative to a reference altitude profile determined by a flight management system of the aircraft, each energy state being chosen from the group consisting of: state above the reference altitude profile, state on the reference altitude profile and state below the reference altitude profile;
determining a high-energy joining profile representative of a future path of the aircraft with an energy dissipation strategy, the determination being carried out backwards starting substantially from the corresponding altitude constraint and/or the corresponding speed constraint up to the current position of the aircraft, depending on the type of meeting and the energy state of the aircraft;
determining energy deviations of the aircraft relative to the high-energy joining profile;
displaying energy deviations.

According to other advantageous aspects of the invention, the method comprises one or more of the following features, considered alone or according to all technically possible combinations:

the constraint point and/or at least one constraint associated with this constraint point are defined by an operator piloting the aircraft or are communicated by an air traffic control entity or come from a database determined beforehand;

when the energy state of the aircraft corresponds to the state above the reference altitude profile and the meeting type corresponds to the altitude meeting, the high-energy joining profile is determined backwards substantially from the corresponding altitude constraint to the current position of the aircraft, a constant engine thrust and the current speed of the aircraft considered to be constant;

when the energy state of the aircraft corresponds to the state above the reference altitude profile and the meeting type corresponds to the speed meeting, the high-energy joining profile is determined backwards substantially from the corresponding speed constraint, with a constant engine thrust and with acceleration up to a final speed equal at a maximum speed of the flight envelope, then at this maximum speed considered to be constant until reaching the current position of the aircraft, or reaching the current position of the aircraft;

when the energy state of the aircraft corresponds to the state above the reference altitude profile and the meeting type corresponds to the mixed meeting; a first high-energy joining profile is determined backwards substantially from the corresponding speed constraint and the corresponding altitude constraint, with a constant engine thrust and with acceleration up to a final speed equal to the current speed of the aircraft, then at this current speed considered to be constant until reaching the current position of the aircraft, or reaching the current position of the aircraft; and a second high-energy joining profile is determined backwards substantially from the corresponding speed constraint and the corresponding altitude constraint, with a constant engine thrust and with acceleration up to a final speed equal to a maximum speed of the flight envelope, then at this maximum speed considered to be constant until reaching the current position of the aircraft, or reaching the current position of the aircraft;

when the energy state of the aircraft corresponds to the state on the reference altitude profile and the meeting type corresponds to the speed meeting or the mixed meeting, the high-energy joining profile is determined backwards substantially from the corresponding speed constraint, along the reference altitude profile, with a constant engine thrust and with acceleration up to a final speed equal at a maximum speed of the flight envelope, then at this maximum speed considered to be constant until reaching the current position of the aircraft, or reaching the current position of the aircraft;

when the energy state of the aircraft corresponds to the state below the reference altitude profile and the meeting type corresponds to the speed meeting or the mixed meeting, the high-energy joining profile is determined backwards substantially from the corresponding speed constraint to the position of the aircraft at one or several constant vertical speeds to reproduce a profile representative of the future path of the aircraft;

each energy deviation is chosen from the group consisting of an altitude deviation corresponding to the difference between the current altitude of the aircraft and the altitude determined according to the high-energy joining profile in the current horizontal position of the aircraft; first distance deviation corresponding to the lateral distance between the current position of the aircraft and the high-energy joining profile at the current altitude of the aircraft; speed deviation corresponding to the difference between the current speed of the aircraft and the speed determined according to the high-energy joining profile at the current position of the aircraft; second distance deviation corresponding to the lateral distance between the current position of the aircraft and the high-energy joining profile at the current speed of the aircraft; total energy deviation relative to a total reference energy; kinetic energy deviation relative to a reference kinetic energy; potential energy deviation relative to a reference potential energy; total height deviation relative to a total reference height;

each energy deviation comprises a speed anticipation term and an altitude anticipation term corresponding to the reaction time of an operator of the aircraft to actuate devices for dissipating the energy of the aircraft and/or the extension time of the devices to dissipate the energy and/or the time related to the inertia of the aircraft;

the step for displaying energy deviations further comprises, when the deviations are made up solely of anticipation terms, displaying a piloting action making it possible to implement the strategy for dissipating energy;

when the energy state of the aircraft corresponds to the state above the reference altitude profile and the meeting type corresponds to the altitude meeting, the step for displaying energy deviations comprises displaying the altitude deviation in a display zone for the current altitude of the aircraft and the first distance deviation in a display zone for the lateral path of the aircraft;

when the energy state of the aircraft corresponds to the state above the reference altitude profile and the meeting type corresponds to the speed meeting; or the energy state of the aircraft corresponds to the state on the reference altitude profile or below the reference altitude profile and the meeting type corresponds to the speed meeting or the mixed meeting; the step for displaying energy deviations comprises displaying the speed deviation in a display zone for the current speed of the aircraft and the second distance deviation in a display zone for the lateral path of the aircraft;

when the energy state of the aircraft corresponds to the state above the reference altitude profile and the meeting type corresponds to the mixed meeting, the step for displaying energy deviations comprises displaying the altitude deviation in a display zone for the current altitude of the aircraft, the speed deviation in a zone for displaying the current speed of the aircraft and the smallest distance from among the first distance deviation and the second deviation, in a display zone for the lateral path of the aircraft; and the step for displaying energy deviations comprises displaying an energy scale of the aircraft, and on this scale, the total energy deviation or the kinetic energy deviation or the potential energy deviation or the total height deviation, and in which the step for displaying energy deviations preferably comprises displaying the total height deviation on an altitude display scale of the aircraft.

The invention also relates to a computer program product including software instructions which, when implemented by computer equipment, carry out the method as previously defined.

The invention also relates to an aid system for controlling the energy situation of an aircraft, the energy situation being defined by the altitude and the speed of the aircraft.

The system includes technical means configured for:

determining an energy meeting point corresponding to a point of a flight plan of the aircraft, called constraint point, having an altitude constraint and/or a speed constraint;

for the determined energy meeting point:
determining a type of meeting based on the constraint at the constraint point, each type of meeting being chosen from the group consisting of: altitude meeting, speed meeting and mixed meeting;

determining an energy state of the aircraft relative to a reference altitude profile determined by a flight management system of the aircraft, each energy state being chosen from the group consisting of: state above the reference altitude profile, state on the reference altitude profile and state below the reference altitude profile;

determining a high-energy joining profile representative of a future path of the aircraft with an energy dissipation strategy, the determination being carried out backwards starting substantially from the corresponding altitude constraint and/or the corresponding speed constraint up to the current position of the aircraft, depending on the type of meeting and the energy state of the aircraft;

determining energy deviations of the aircraft relative to the high-energy joining profile;

displaying the energy deviations.

BRIEF DESCRIPTION OF THE DRAWINGS

These features and advantages of the invention will appear upon reading the following description, provided solely as a non-limiting example, and done in reference to the appended drawings, in which.

DETAILED DESCRIPTION OF THE INVENTION

Figure 1:
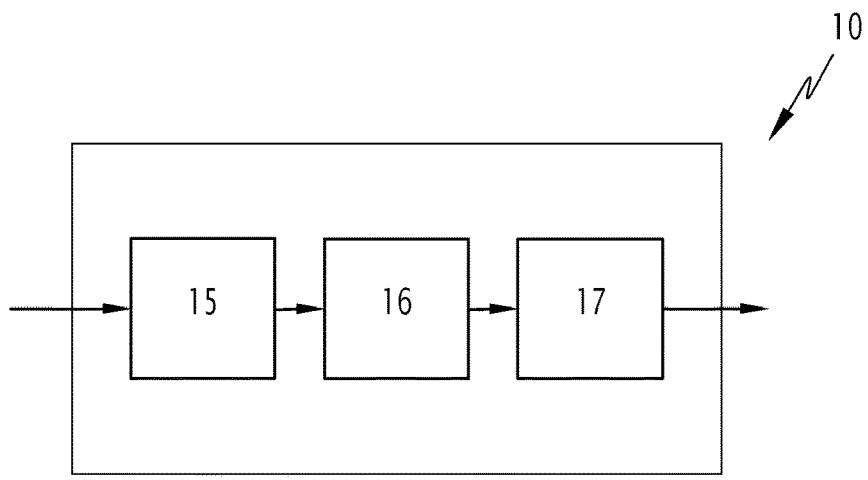
FIG. 1 is a schematic illustration of an aid system for control according to the invention.

The aid system for control 10 of FIG. 1 allows an operator piloting an aircraft to control the energy situation of the aircraft in particular to comply with various constraints at energy meeting points.

"Aircraft" refers to any flying vehicle at least in the Earth's atmosphere and able to be piloted by an operator from a cockpit of this vehicle or from a remote piloting center. Examples of such an aircraft in particular include an airplane, helicopter or drone.

In a manner known in itself, the aircraft is able to fly with a speed comprised in a flight envelope that optionally depends on the flight phase of the aircraft, and in particular the aerodynamic configuration of the aircraft. This envelope is defined by a minimum speed and a maximum speed.

"Constant engine thrust" refers to a load value modeling the maintenance of the best in-flight idle, commonly called "IDLE" load. This thrust includes margins used to offset operating unknowns, such as unexpected wind, for example.

"Energy situation" refers to a value characterizing the energy of the aircraft and then defined based on its speed and altitude.

"Energy meeting point" refers to a point on the flight plan of the aircraft, called constraint point, having an energy constraint, i.e., an altitude constraint and/or a speed constraint.

In the example described below, the aircraft is an airplane, in particular an airliner, in particular including a flight management system of the FMS type, a display system and a system of mobile outside devices.

In a manner known in itself, the flight management system assumes the form of a computer in particular making it possible to determine a theoretical profile relative to the path of the aircraft and predictions relative to this theoretical profile. The theoretical profile in particular comprises a component forming a reference altitude profile relative to the altitude of the aircraft along its path and a component forming a reference speed profile relative to the speed of the aircraft along its path.

The theoretical profile is determined while respecting a flight plan of the aircraft for example introduced by the operator into the flight management system beforehand.

The display system comprises multiple screens.

Among these display screens, one screen, called FMS display screen, is dedicated to displaying information relative to the flight management system; one screen, called PFD (Primary Flight Display), is dedicated to displaying information essential to the piloting of the aircraft, such as the speed, altitude or horizontal plane; one screen, called ND (Navigation Display), is dedicated to displaying information relative to navigation, and more particularly the lateral path of the aircraft; and one screen, called VD (Vertical Display), is dedicated to displaying the vertical path of the aircraft.

These different display screens are for example arranged in the cockpit of the aircraft in known positions and can be completed by one or several head-up displays (HUD).

The system of mobile outside devices comprises a plurality of mobile surfaces located outside the aircraft and landing gear. The mobile surfaces are known in themselves and for example have air brakes, leading-edge slats and flaps.

At each moment, each mobile surface or each landing gear has an operating state defining its position and/or its orientation relative to the fuselage of the aircraft.

The operating states of the set of mobile outside devices then define an aerodynamic configuration of the aircraft.

These mobile outside devices can be controlled by the operator and/or by an appropriate avionics system.

Furthermore, in a manner known in itself, the changes in operating states of the mobile outside devices make it possible to modify the energy situation of the aircraft.

In the rest of the description, "energy dissipation strategy" refers to a piloting strategy for the operation of the mobile outside devices making it possible to dissipate the energy of the aircraft.

Thus, when such a strategy is engaged, the corresponding mobile outside devices form energy dissipation devices of the aircraft.

In reference to FIG. 1, the determining system 10 comprises an acquisition module 15, a processing module 16 and an output module 17.

In the described example, the determining system 10 is integrated into the flight management system of the aircraft. In this case, the aforementioned modules for example assume the form of software programs that are then implemented by the computer forming the flight management system.

Alternatively, at least some of these modules assume the form, at least partially, of an independent electronic component, for example a field-programmable gate array (FPGA).

Also alternatively, the determining system 10 is integrated into any other avionics system, or assumes the form of an independent computer. In this last case, the determining system 10 further comprises a memory able to store a plurality of software programs, and in particular software programs forming the aforementioned modules, and a processor able to execute these programs.

Of course, other embodiments of the determining system 10 are also possible.

The input module 15 is able to acquire the current position of the aircraft, the speed of the aircraft, the theoretical profile, the flight plan and the operating states of the various mobile outside devices.

The processing module 16 is able to process the various data acquired by the input module 15 in order to provide aid to the operator in controlling the energy situation of the aircraft, as will be explained hereinafter.

Lastly, the output module 17 is able to process the data from the processing module 16 in particular in order to display them in the cockpit via the display system of the aircraft.

Figure 2:
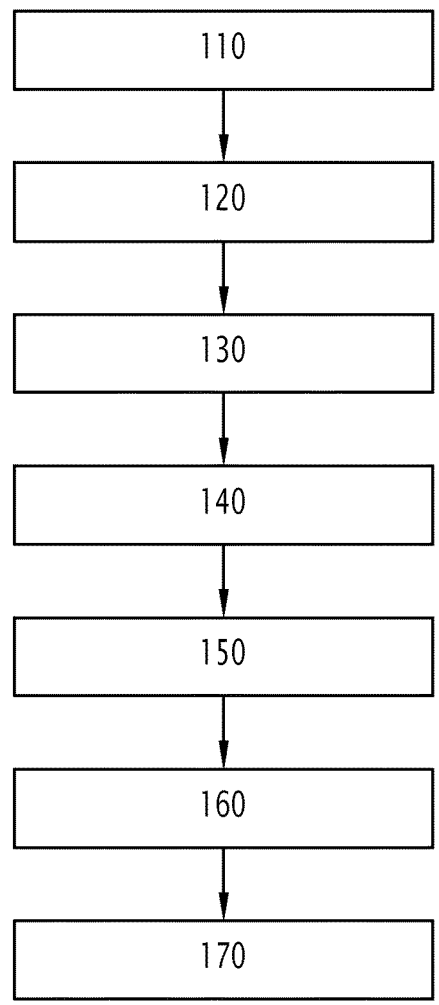
FIG. 2 is a flowchart of an aid method for control according to the invention, the method being carried out by the aid system for control of FIG. 1.

The aid method for control according to the invention will now be explained in reference to FIG. 2, showing a flowchart of its steps, and in reference to FIGS. 3 to 9 illustrating different example embodiments of these steps.

This method is carried out for example when the aircraft enters the descent phase and is for example reiterated all throughout this phase until landing.

Furthermore, before carrying out this method, the flight plan of the aircraft comprises at least one constraint point as previously defined.

This constraint point and/or at least one constraint associated with this constraint point for example come from a database used to build the flight plan or are communicated by an air traffic control entity.

According to another example, this constraint point and/or at least one constraint associated with this constraint point are designated by the operator. In this case, the flight management system is adapted so as to allow the operator to impose an altitude and/or speed meeting at any point of the flight plan. This designation is for example done from the FMS screen by using a suitable communication interface.

Thus, during the initial step 110, the input module 15 acquires the current position of the aircraft, the speed of the aircraft, the theoretical profile, the flight plan and the operating states of the various mobile outside devices.

At the end of step 110, the input module 15 sends all of the acquired data to the processing module 16.

Then, during the following step 120, the processing module 16 determines the next energy meeting point.

In particular, this energy meeting point corresponds to the next constraint point of the flight plan, i.e., to the constraint point of the flight plan closest to the current position of the aircraft.

According to one advantageous aspect of the invention, during this step, the operator has a possibility of confirming the energy meeting point chosen by the processing module 16 or rejecting this choice. In the latter case, the processing module 16 for example proposes the next constraint point of the flight plan as an energy meeting point or the operator himself designates an energy meeting point via the FMS screen, as previously explained.

The following steps are then carried out for the energy meeting point determined during this step 120.

During the following step 130, for the determined energy meeting point, the processing module 16 determines a meeting type based on the constraint at the constraint point corresponding to this energy meeting point.

In particular, each meeting type is chosen from the group consisting of: altitude meeting, speed meeting and mixed meeting.

Thus, the energy meeting point is of the altitude meeting type when the corresponding constraint point has an altitude constraint, of the speed meeting type when the corresponding constraint point has a speed constraint, and of the mixed meeting type when the corresponding constraint point has an altitude and speed constraint.

During the following step 140, for the determined energy meeting point, the processing module 16 determines an energy state of the aircraft relative to the reference altitude profile.

Each energy state is chosen from the group consisting of: state below the reference altitude profile, state on the reference altitude profile and state above the reference altitude profile.

In particular, these states are chosen based on the current position of the aircraft relative to the reference altitude profile with an altitude margin.

According to one example embodiment, the altitude margin varies and depends on the speed, the airplane altitude, etc. Thus, for example, at a low altitude and/or low speed, this margin is equal to 50 feet. At a high altitude and/or high speed, this margin is equal to 200 feet.

Thus, the energy state of the aircraft is chosen as being above the reference altitude profile when the current position of the aircraft is above the altitude profile to which the altitude margin is added, on the reference altitude profile when the current position of the aircraft is located between the altitude profile from which the altitude margin is subtracted and the altitude profile to which the altitude margin is added, and below the reference altitude profile when the current position of the aircraft is below the altitude profile from which the altitude margin is subtracted.

Then, during the following step 150, the processing module 16 determines a high-energy joining profile representative of a future path of the aircraft with an energy dissipation strategy.

In other words, the high-energy joining profile designates an altitude and/or speed limit profile of the aircraft making it possible to join the corresponding energy meeting point by applying a given energy dissipation strategy.

Thus, when the aircraft intercepts the high-energy joining profile by applying the given energy dissipation strategy, the aircraft will be able to reach the corresponding energy meeting point. When the aircraft intercepts the high-energy joining profile without applying the given energy dissipation strategy, the aircraft will not be able to reach the meeting point.

The high-energy joining profile is determined using a determining mode chosen based on the meeting type and the energy state of the aircraft that are determined during prior steps.

All of these determining modes comprise a determination carried out backwards starting substantially from the corresponding altitude constraint and/or the corresponding speed constraint up to the current position of the aircraft.

In the rest of the description, expressions such as "starting substantially" or "substantially from" mean that the starting point for the corresponding determination is chosen in a predetermined neighborhood from the point to which these expressions refer. This neighborhood is made up of a set of points separated from this point by an altitude (respectively speed) value not exceeding the value of the altitude (respectively speed) constraint by 250 feet (respectively 10 kts) from this point and/or by a distance value not exceeding 3 NM from the position of the constraint. The values of the preceding allowances are provided solely for information and may change based on precision needs or standards.

In the described example, five determining modes are implemented. In the rest of the description, these modes are named based on the following table, depending on the type of meeting (the first row of the table) and the energy state of the aircraft (the first column of the table):

|  | altitude meeting | speed meeting | mixed meeting |
|---|---|---|---|
| above the reference altitude profile | mode A1 | mode A2 | mode A3 |
| on the reference altitude profile |  |  | mode B23 |
| below the reference altitude profile |  |  | mode C23 |

It should be noted that when the meeting type corresponds to the altitude meeting and the energy state corresponds to the state on the reference altitude profile or below the reference altitude profile, the determination of a high-energy joining profile is not relevant for the corresponding energy meeting point. In this case, the method is for example carried out again from step 110 for another energy meeting point when the point is sequenced or if the aircraft goes above the reference altitude profile or if the operator designates another energy meeting point.

According to mode A1, the high-energy joining profile is determined substantially from the corresponding altitude constraint up to the current position of the aircraft, with a constant engine thrust and at the current speed of the aircraft considered to be constant.

This profile is for example determined in the hypothesis of an energy dissipation strategy comprising the extension of the air brakes at 50%.

Figure 3:
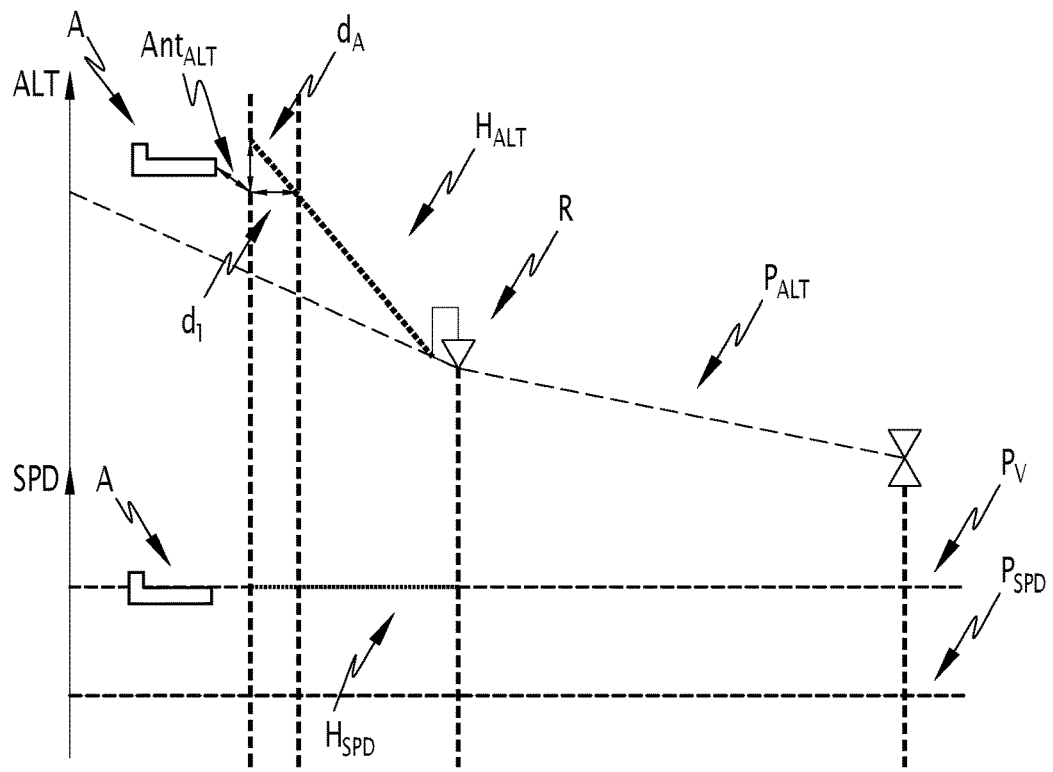
FIGS. 3 to 9 illustrate the implementation of the aid method for control of FIG. 2.

Determining mode A1 is schematically illustrated in FIG. 3.

Indeed, according to the case illustrated in this figure, the aircraft A continues its flight above a reference altitude profile $P_{ALT}$ and a reference speed profile $P_{SPD}$, with an energy meeting point determined by a point R having an altitude constraint. The meeting type at this point R therefore corresponds to the altitude meeting.

In this case, a high-energy joining profile comprising an altitude component $H_{ALT}$ and a speed component $H_{SPD}$ is determined backwards starting substantially from the point R to the current position of the aircraft A with a speed according to a profile $P_V$ then corresponding to the current speed of the aircraft, considered to be constant.

According to mode A2, the high-energy joining profile is determined substantially from the corresponding speed constraint up to the current position of the aircraft, with a constant engine thrust and with acceleration up to:
- a final speed equal to a maximum speed of the flight envelope, then at this maximum speed, considered to be constant, until reaching the current position of the aircraft, or
- reaching the current position of the aircraft.

This profile is for example determined in the hypothesis of an energy dissipation strategy comprising the extension of the air brakes at 50%.

According to one example embodiment, if the maximum speed of the flight envelope is reached, the determination of the high-energy joining profile is continued, still with acceleration, but in a different aerodynamic configuration of the aircraft making it possible to broaden this envelope until reaching the current configuration of the aircraft.

Figure 4:
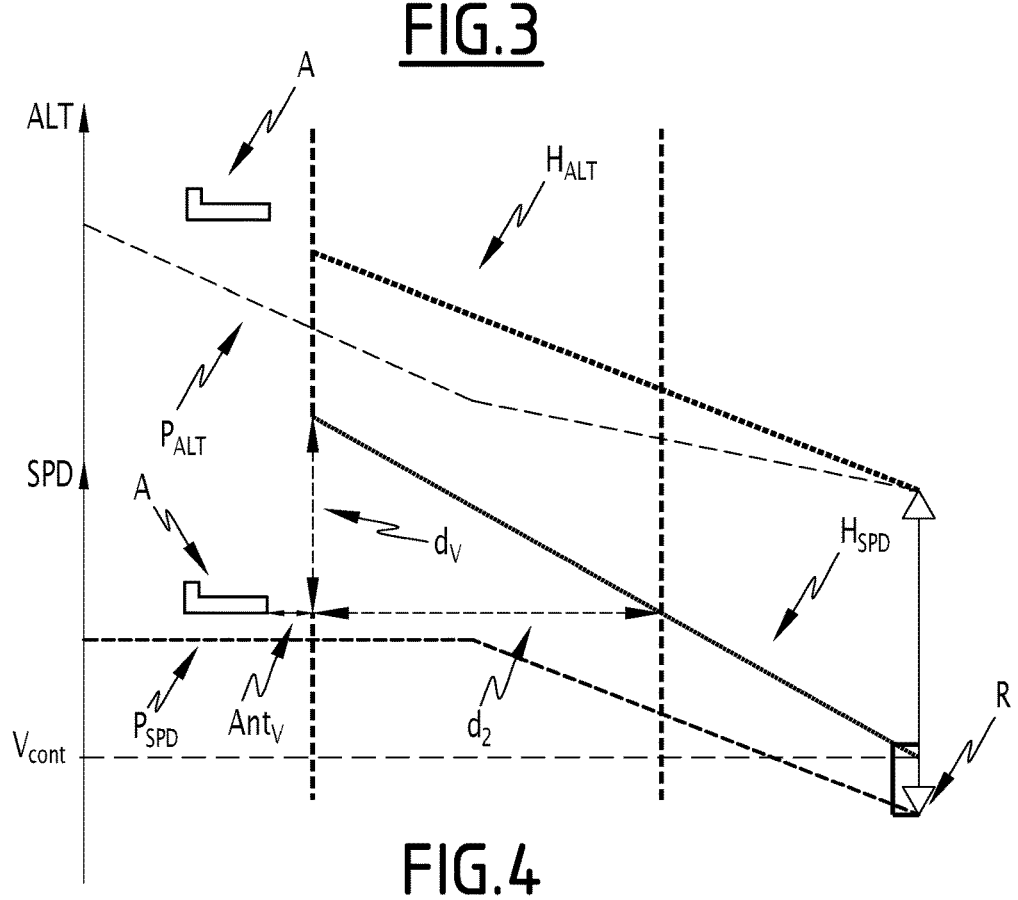

Determining mode A2 is schematically illustrated in FIG. 4.

Indeed, according to the case illustrated in this figure, the aircraft A continues its flight above a reference altitude profile $P_{ALT}$ and a reference speed profile $P_{SPD}$, with an energy meeting point determined by a point R having a speed constraint. The meeting type at this point R therefore corresponds to the speed meeting.

In this case, a high-energy joining profile comprising an altitude component $H_{ALT}$ and a speed component $H_{SPD}$ is determined backwards starting substantially from the point R and with acceleration with an initial speed $V_{cont}$ substantially equal to the speed of the constraint at the point R and until reaching the current position of the aircraft A.

According to mode A3, a first high-energy joining profile is determined substantially from the corresponding speed constraint and the corresponding altitude constraint, with a constant engine thrust and with acceleration up to:
- a final speed equal to the current speed of the aircraft, then at this current speed, considered to be constant until reaching the current position of the aircraft, or
- reaching the current position of the aircraft.

According to the same mode A3, a second high-energy joining profile is also determined substantially from the corresponding speed constraint and the corresponding altitude constraint, with a constant engine thrust and with acceleration up to:
- a final speed equal to a maximum speed of the flight envelope, then at this maximum speed, considered to be constant, until reaching the current position of the aircraft, or
- reaching the current position of the aircraft.

The two profiles are for example determined in the hypothesis of an energy dissipation strategy comprising the extension of the air brakes at 50%.

According to one example embodiment, if the maximum speed of the flight envelope is reached, the determination of at least one of the two high-energy joining profile is continued, still with acceleration, but in a different aerodynamic configuration of the aircraft making it possible to broaden this envelope until reaching the current configuration of the aircraft.

Figure 5:
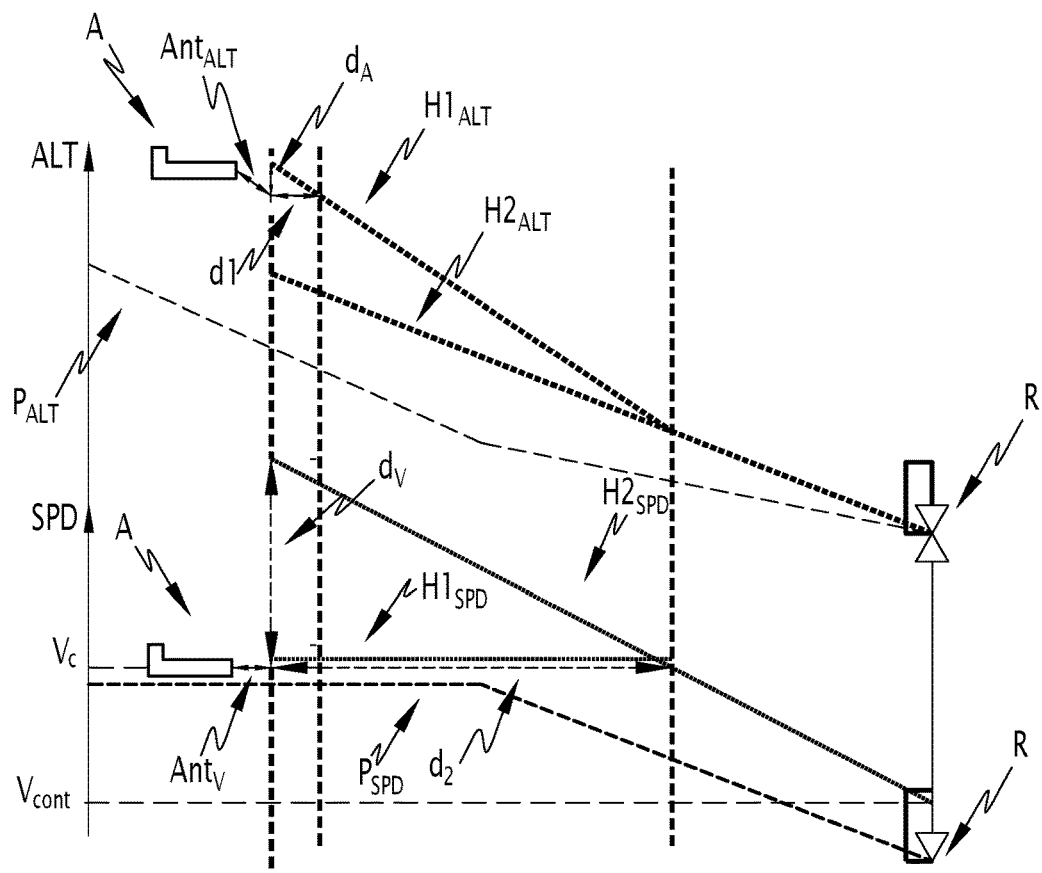

Determining mode A3 is schematically illustrated in FIG. 5.

Indeed, according to the case illustrated in this figure, the aircraft A continues its flight above a reference altitude profile $P_{ALT}$ and a reference speed profile $P_{SPD}$, with an energy meeting point determined by a point R having an altitude constraint and a speed constraint. The meeting type at this point R therefore corresponds to the mixed meeting.

In this case, a first high-energy joining profile comprising an altitude component $H1_{ALT}$ and a speed component $H1_{SPD}$ is determined backwards starting substantially from the point R and with acceleration with an initial speed $V_{cont}$ substantially equal to the speed $V_{cont}$ at the point R and until reaching the current position of the aircraft $V_C$, then this current speed $V_C$ considered to be constant until reaching the current position of the aircraft.

In the same FIG. 5, a second high-energy joining profile comprising an altitude component $H2_{ALT}$ and a speed component $H2_{SPD}$ is determined backwards starting substantially from the point R and with acceleration with an initial speed $V_{cont}$ substantially equal to the speed $V_{cont}$ at the point R and until reaching the current position of the aircraft.

According to mode B23, the high-energy joining profile is determined substantially from the corresponding speed constraint, along the reference altitude profile, with a constant engine thrust and with acceleration until:
- a final speed equal to a maximum speed of the flight envelope, then at this maximum speed, considered to be constant, until reaching the current position of the aircraft, or
- reaching the current position of the aircraft.

This profile is for example determined in the hypothesis of an energy dissipation strategy comprising the extension of the air brakes at 50%.

According to one example embodiment, if the maximum speed of the flight envelope is reached, the determination of the high-energy joining profile is continued, still with acceleration, but in a different aerodynamic configuration of the aircraft making it possible to broaden this envelope until reaching the current configuration of the aircraft.

Figure 6:
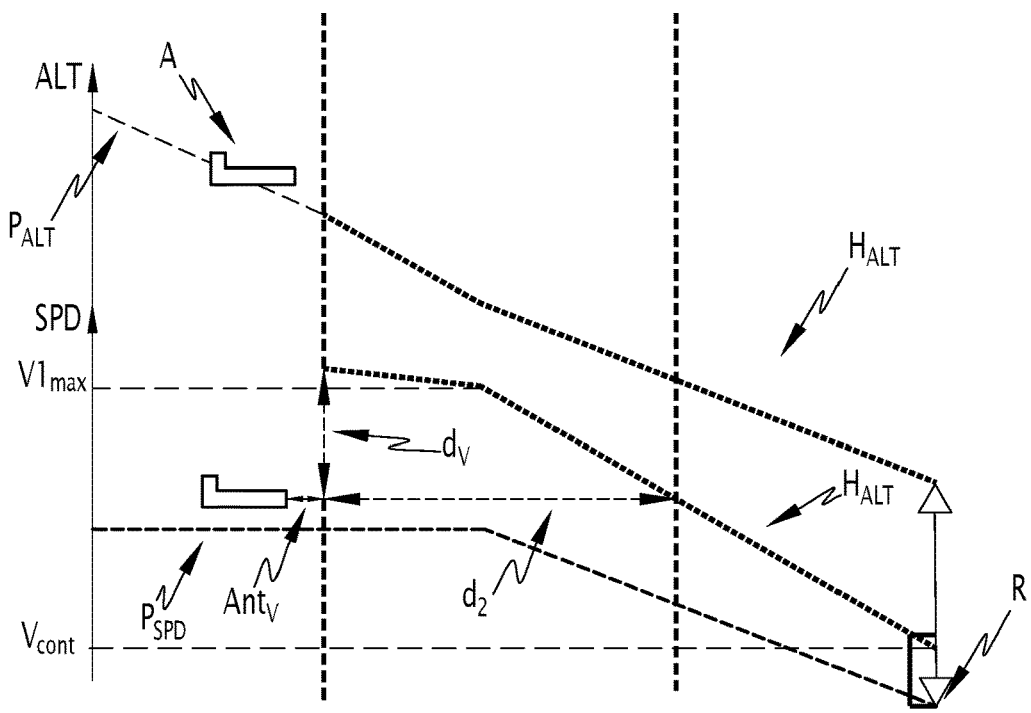

Determining mode B23 is schematically illustrated in FIG. 6.

Indeed, according to the case illustrated in this figure, the aircraft A continues its flight on a reference altitude profile $P_{ALT}$ and above a reference speed profile $P_{SPD}$, with an energy meeting point determined by a point R having a speed constraint. The meeting type at this point R therefore corresponds to the speed meeting, which is handled equivalently to a mixed meeting in this case.

In this case, a high-energy joining profile comprising an altitude component $H_{ALT}$ and a speed component $H_{SPD}$ is determined backwards starting substantially from the point R along the reference altitude profile $P_{ALT}$, and with acceleration with an initial speed $V_{cont}$ substantially equal to the speed of the constraint at the point R up to a final speed equal to a first maximum speed $V1_{max}$ of the current flight envelope of the aircraft, then in another aerodynamic configuration making it possible to broaden the current flight envelope, with acceleration until reaching the current position of the aircraft until reaching the current configuration of the aircraft.

Lastly, according to mode C23, the high-energy joining profile is determined substantially from the corresponding speed constraint to the position of the aircraft at one or several constant vertical speeds to reproduce a profile representative of the future path of the aircraft.

These speeds are for example chosen to be equal to −1000 ft/min, −500 ft/min or 0 ft/min so as to best reproduce the future path of the aircraft.

This determination is for example done using the prior prediction determination according to methods known in themselves or by an iterative backwards determination.

Figure 7:
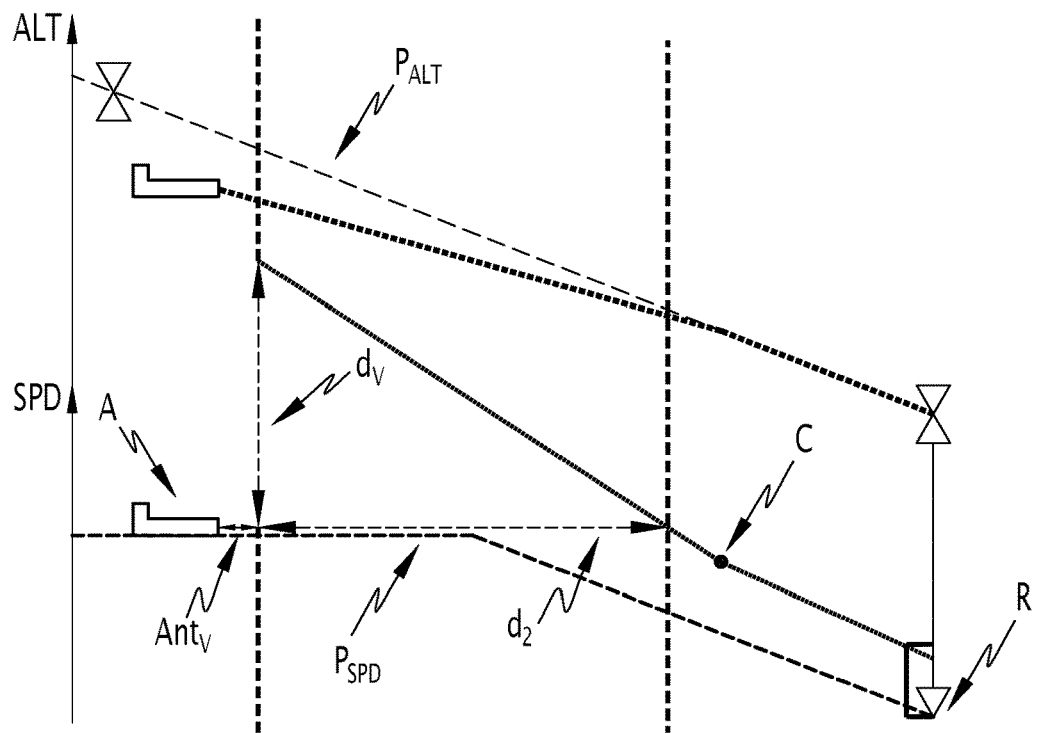

Determining mode C23 is schematically illustrated in FIG. 7.

Indeed, according to the case illustrated in this figure, the aircraft A continues its flight below a reference altitude profile $P_{ALT}$ and on a reference speed profile $P_{SPD}$, with an energy meeting point determined by a point R having a speed constraint. The meeting type at this point R therefore corresponds to the speed meeting, which is handled equivalently to a mixed meeting in this case.

In this case, a high-energy joining profile comprising an altitude component $H_{ALT}$ and a speed component $H_{SPD}$ is determined backwards starting substantially from the point R to join the reference altitude profile $P_{ALT}$, and with acceleration with a first constant vertical speed up to a point C, then with a constant second vertical speed.

During the following step 160, the processing module 16 determines energy deviations of the aircraft relative to the high-energy joining profile. This step 160 as well as the following step 170 are for example reiterated until the aircraft reaches the energy meeting point or intercepts the high-energy joining profile.

In particular, each energy deviation is chosen from the group consisting of:
  altitude deviation corresponding to the difference between the current altitude of the aircraft and the altitude determined according to the high-energy joining profile with the current horizontal position of the aircraft;
  first distance deviation corresponding to the lateral distance between the current position of the aircraft and the high-energy joining profile with the current altitude of the aircraft;
  speed deviation corresponding to the difference between the current speed of the aircraft and the speed determined according to the high-energy rejoining profile with the current position of the aircraft;
  second distance deviation corresponding to the lateral distance between the current position of the aircraft and the high-energy joining profile with the current speed of the aircraft;
  total energy deviation relative to a reference total energy;
  kinetic energy deviation relative to a reference kinetic energy;
  potential energy deviation relative to a reference potential energy;
  total height deviation relative to a reference total height.

It should be noted that, in a manner known in itself, the total height makes it possible to express the energy of the aircraft in a unit of length (meter or foot, for example) and is determined using the following expression:

$$h_t = h + v^2/(2g);$$

where
  $h_t$ is the total height;
  h is the current altitude of the aircraft;
  v is the current speed of the aircraft; and
  g is the acceleration of gravity.

Furthermore, "reference total energy", "reference kinetic energy", "reference potential energy" or "reference total height" respectively refer to the total energy, kinetic energy, potential energy or total height determined according to the reference profile of the aircraft.

When the deviations are determined from the current position of the aircraft, each deviation comprises a speed anticipation term, an altitude anticipation term and an effective anticipation term.

"Speed anticipation" and "altitude anticipation" correspond to the reaction time by the operator of the aircraft to actuate energy dissipation devices of the aircraft and/or the extension time of these devices and/or the time related to the inertia of the aircraft.

The effective time thus corresponds to the deviation of the aircraft relative to the high-energy joining profile once the aircraft has an established configuration implementing the corresponding energy dissipation strategy.

According to one example embodiment, all of the aforementioned deviations are determined during step 160.

According to another example embodiment, only some of the aforementioned deviations are determined, in particular based on the determining mode chosen during step 150.

Thus, for example, when mode A1 has been used during step 150, during the present step, an altitude deviation and a first distance deviation are in particular determined. The effective terms of these deviations are respectively designated by references "$d_A$" and "$d_1$" in FIG. 3. Furthermore, in this figure, these terms $d_A$ and $d_1$ are separated from the current position of the aircraft by a distance $Ant_{ALT}$ corresponding to the altitude anticipation terms of these deviations.

When mode A2 or mode B23 or mode C23 has been used during step 150, during the present step, a speed deviation and a second distance deviation are in particular determined. The effective terms of these deviations are respectively designated by references "$d_v$" and "$d_2$" in FIGS. 4, 6 and 7. Furthermore, in these figures, these terms $d_v$ and $d_2$ are separated from the current position of the aircraft by a distance Ant corresponding to the speed anticipation terms of these deviations.

When mode A3 has been used during step 150, during the present step, an altitude deviation, a speed deviation, a first distance deviation and a second distance deviation are in particular determined. The effective terms of these deviations are respectively designated by references "$d_A$", "$d_v$", "$d_1$" and "$d_2$" in FIG. 5. Furthermore, in this figure, these terms $d_A$, $d_v$, $d_1$ and $d_2$ are separated from the current position of the aircraft by a distance $Ant_v$ or by a distance $Ant_{ALT}$ corresponding to the speed or altitude anticipation terms of these deviations.

At the end of step 160, the processing module 16 sends the high-energy joining profiles and all of the determined deviations to the output module 17.

During the following step 170, the output module 17 processes all of the data received from the processing module 16 in order to display them on at least one screen of the display system of the aircraft.

In other words, during this step, the output module 17 generates a display suitable for one or several display screens of the display system of the aircraft.

In particular, according to one example embodiment of the invention, such a display comprises the display of the or each high-energy joining profile in a display zone dedicated to displaying the vertical path of the aircraft and the reference profile. This display zone is for example arranged on the screen VD.

Furthermore, this display comprises the display of the energy deviations chosen based on the corresponding meeting type and the energy step of the aircraft. In other words, these deviations are chosen based on the determining mode used during step 150.

Advantageously, the displayed deviations are displayed from the current position of the aircraft, i.e., taking their anticipation terms into account.

In particular, when mode A1 has been used during step 150, the display comprises displaying the altitude deviation in a display zone of the current altitude 20 of the aircraft and the first distance deviation in the display zone of the lateral path of the aircraft.

The first distance deviation in the display zone of the lateral path of the aircraft for example corresponds to the horizontal distance between a symbol indicating the current position of the aircraft and the display of the altitude component of the high-energy joining profile.

Figure 8:
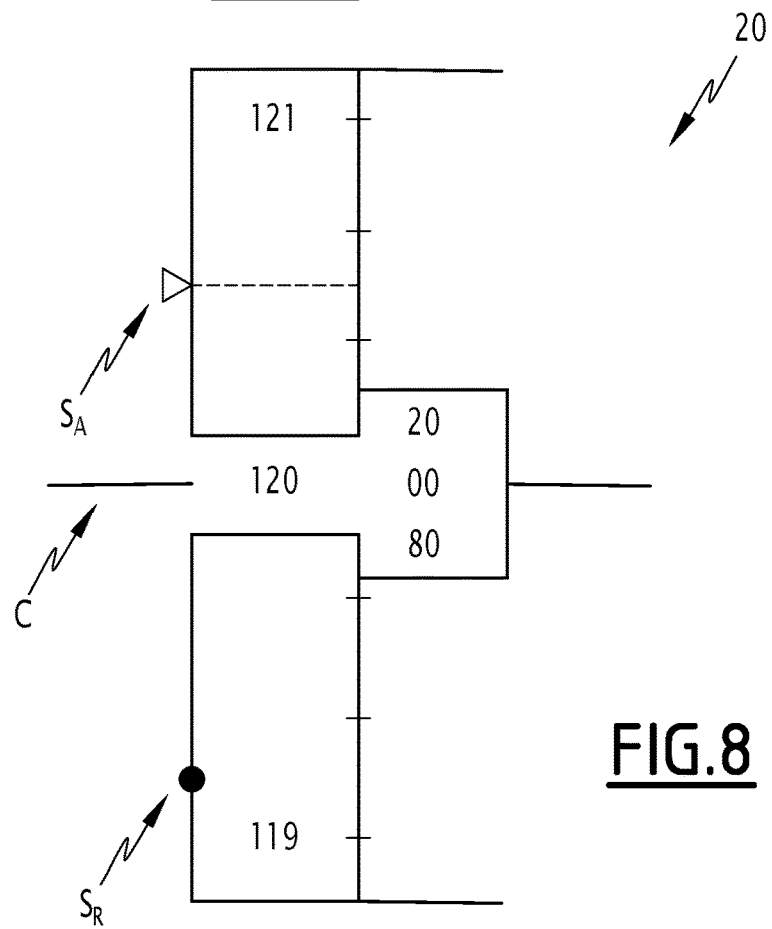

The display zone of the current altitude 20 is for example arranged on the screen PFD and is schematically illustrated in FIG. 8.

Thus, in the case illustrated in this FIG. 8, the current altitude of the aircraft of 12,000 feet is displayed at the center C of a scale forming the display zone of the current altitude 20. A symbol $S_A$ is arranged on the same scale away from the center C of the scale in the positive direction, by a value equal to the altitude deviation.

In FIG. 8, the symbol $S_A$ indicates the value of 12,500 feet on the scale. This then means that the effective term of the altitude deviation is equal to 500 feet. Furthermore, in the same figure, a symbol $S_R$ indicates the altitude of the reference altitude profile, which is then less than the current altitude of the aircraft.

When mode A2 or mode B23 or mode C23 has been used during step 150, the step for displaying energy deviations comprises displaying the speed deviation in a display zone for the current speed 30 of the aircraft and the second distance deviation in the display zone for the lateral path of the aircraft.

The second distance deviation in the display zone of the lateral path of the aircraft for example corresponds to the horizontal distance between a symbol indicating the current position of the aircraft and the display of the speed component of the high-energy joining profile.

Figure 9:
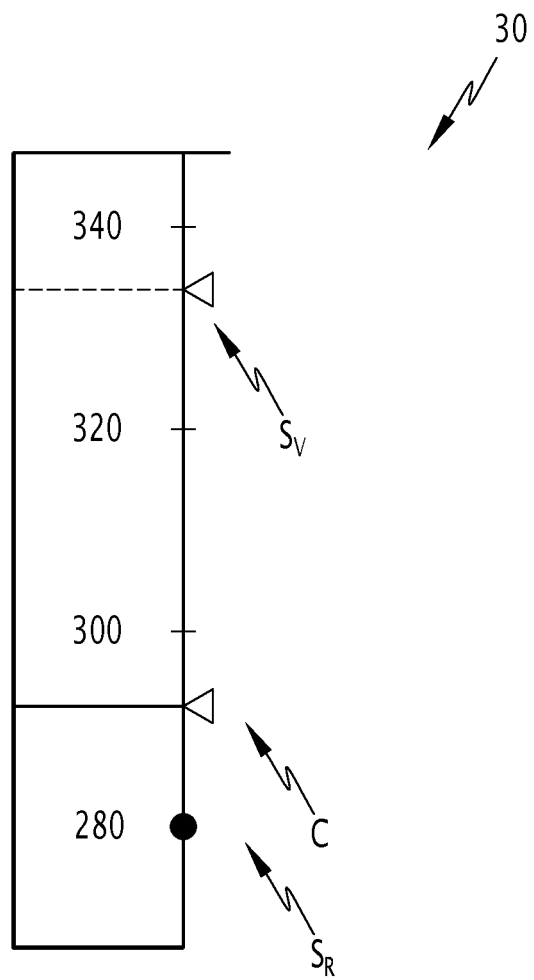

The display zone of the current speed 30 is for example arranged on the screen PFD and is schematically illustrated in FIG. 9.

Thus, in the case illustrated in this FIG. 9, the display zone 30 assumes the form of a scale of values of the calibrated airspeed (CAS) of the aircraft. The current speed of the aircraft is indicated by a symbol C and is therefore equal to 295 kits.

Furthermore, in this display zone 30, a symbol $S_V$ is arranged on the same scale and indicates the value of the speed according to the high-energy joining profile. This value is equal to 335 kts. The deviation between the two values indicated by the symbols $S_V$ and C therefore corresponds to the effective term of the speed deviation. Furthermore, in the same figure, a symbol $S_R$ indicates the speed of the reference speed profile.

When mode A3 has been used during step 150, the display comprises displaying the altitude deviation in the display zone for the current altitude 20, the speed deviation in the display zone for the current speed 30 of the aircraft and the smallest distance from among the first distance deviation and the second distance deviation, in the display zone for the lateral path of the aircraft.

According to one particularly advantageous example embodiment of the invention, the display further comprises an energy scale of the aircraft, and on this scale, the total energy deviation or the kinetic energy deviation or the potential energy deviation or the total height deviation.

This energy scale is for example arranged on the screen PFD near the display zone for the current speed 30.

This energy scale is for example displayed independently of the determining mode chosen during step 150. The total height being homogeneous at an altitude, it may nevertheless be displayed on the display band for the altitude already existing on the screen PFD.

Lastly, when the output module 17 detects that the effective terms of the deviations are becoming equal to zero, i.e., when the determined deviations are made up solely of anticipation terms, the output module 17 generates a display of a message telling the operator the piloting action allowing him to carry out the corresponding energy dissipation strategy.

This message is for example of the type "EXTEND 50% SPEED BRAKES" and then informs the operator of the need to extend the air brakes at 50%.

One can then see that the present invention has a certain number of advantages.

First of all, the high-energy joining profile gives the operator global visibility of the situation regarding the energy meeting points. The operator can thus anticipate these meetings and adapt his piloting strategy accordingly.

Furthermore, the display of different deviations in the cockpit related to each energy meeting point does not create an excess information situation. Indeed, this display is relatively discrete. Furthermore, this new type of display complies with the display already existing for certain data coming from the flight management system, which will allow the user to become accustomed to it quickly.

Lastly, owing to the invention, the operator has better control of the energy meeting points. Indeed, he is able to confirm an energy meeting point chosen by the system or to designate such a point himself.

The invention claimed is:

1. An aid method for controlling the energy situation of an aircraft, the energy situation being defined by the altitude and the speed of the aircraft, comprising:
   determining, by a processor in the aircraft, an energy meeting point corresponding to a point of a flight plan of the aircraft, designated as a constraint point, having an altitude constraint and/or a speed constraint;
   based on the determined energy meeting point:

determining, by the processor in the aircraft, a type of meeting based on the constraint at the constraint point, the type of meeting being chosen from the group consisting of altitude meeting, speed meeting and mixed meeting;

determining, by the processor in the aircraft, an energy state of the aircraft relative to a reference altitude profile determined by a flight management system of the aircraft, the energy state being chosen from the group consisting of a state above the reference altitude profile, a state on the reference altitude profile, and a state below the reference altitude profile;

determining, by the processor in the aircraft, a high-energy joining profile representative of a future path of the aircraft with an energy dissipation strategy, the determination being carried out backwards starting substantially from the corresponding altitude constraint and/or the corresponding speed constraint up to the current position of the aircraft, depending on the type of meeting and the energy state of the aircraft; and determining, by the processor in the aircraft, energy deviations of the aircraft relative to the high-energy joining profile, the energy deviations being indicative of whether or not the aircraft can reach its energy meeting point;

displaying, by a display device, the energy deviations to an operator of the aircraft;

receiving the determined energy meeting point or another energy meeting point designated by the operator of the aircraft in case of rejection of the determined energy meeting point by the operator of the aircraft; and engaging the energy dissipation strategy based on the received energy meeting point, by controlling mobile outside devices.

2. The aid method according to claim 1, comprising defining, by the operator of the aircraft, or communicating by an air traffic control entity, or retrieving from a database determined beforehand, the constraint point and/or at least one constraint associated with the constraint point.

3. The aid method according to claim 1, wherein, when the energy state of the aircraft corresponds to the state above the reference altitude profile and the meeting type corresponds to the altitude meeting, said determining a high-energy joining profile determines the high-energy joining profile backwards substantially from the corresponding altitude constraint to the current position of the aircraft, with a constant engine thrust and at the current speed of the aircraft considered to be constant.

4. The aid method according to claim 1, wherein, when the energy state of the aircraft corresponds to the state above the reference altitude profile and the meeting type corresponds to the speed meeting, said determining a high-energy joining profile determines the high-energy joining profile backwards substantially from the corresponding speed constraint, with constant engine thrust and with acceleration up to:
- a final speed equal to a maximum speed of the flight envelope, then at the maximum speed, considered to be constant, until reaching the current position of the aircraft; or
- reaching the current position of the aircraft.

5. The aid method according to claim 1, wherein, when the energy state of the aircraft corresponds to the state above the reference altitude profile and the meeting type corresponds to the mixed meeting, said determining a first high-energy joining profile comprises:
determining a first high-energy determining profile backwards substantially from the corresponding speed constraint and the corresponding altitude constraint, with a constant engine thrust and with acceleration up to:
- a final speed equal to the current speed of the aircraft, then at this current speed, considered to be constant until reaching the current position of the aircraft; or
- reaching the current position of the aircraft; and determining a second high-energy joining profile backwards substantially from the corresponding speed constraint and the corresponding altitude constraint, with a constant engine thrust and with acceleration up to:
- a final speed equal to a maximum speed of the flight envelope, then at this maximum speed, considered to be constant, until reaching the current position of the aircraft; or
- reaching the current position of the aircraft.

6. The aid method according to claim 1, wherein, when the energy state of the aircraft corresponds to the state on the reference altitude profile and the meeting type corresponds to the speed meeting or the mixed meeting, said determining a high-energy joining profile determines the high-energy joining profile backwards substantially from the corresponding speed constraint, along the reference altitude profile, with constant engine thrust and with acceleration up to:
- a final speed equal to a maximum speed of the flight envelope, then at this maximum speed, considered to be constant, until reaching the current position of the aircraft; or
- reaching the current position of the aircraft.

7. The aid method according to claim 1, wherein, when the energy state of the aircraft corresponds to the state below the reference altitude profile and the meeting type corresponds to the speed meeting or the mixed meeting, said determining a high-energy joining profile determines the high-energy joining profile backwards substantially from the corresponding speed constraint to the position of the aircraft at one or several constant vertical speeds to reproduce a profile representative of the future path of the aircraft.

8. The aid method according to claim 1, wherein each energy deviation is chosen from the group consisting of:
altitude deviation corresponding to the difference between the current altitude of the aircraft and the altitude determined according to the high-energy joining profile with the current horizontal position of the aircraft;
first distance deviation corresponding to the lateral distance between the current position of the aircraft and the high-energy joining profile with the current altitude of the aircraft;
speed deviation corresponding to the difference between the current speed of the aircraft and the speed determined according to the high-energy rejoining profile with the current position of the aircraft;
second distance deviation corresponding to the lateral distance between the current position of the aircraft and the high-energy joining profile with the current speed of the aircraft;
total energy deviation relative to a reference total energy;
kinetic energy deviation relative to a reference kinetic energy;
potential energy deviation relative to a reference potential energy; and
total height deviation relative to a reference total height.

9. The aid method according to claim 1, wherein each energy deviation comprises a speed anticipation term and an altitude anticipation term corresponding to the reaction time of the operator of the aircraft to actuate devices for dissipating the energy of the aircraft and/or the extension time of the devices to dissipate the energy and/or the time related to the inertia of the aircraft.

10. The aid method according to claim 9, wherein said displaying energy deviations comprises, when the deviations are made up solely of anticipation terms, displaying a piloting action making it possible to implement the strategy for dissipating energy.

11. The aid method according to claim 8, wherein, when the energy state of the aircraft corresponds to the state above the reference altitude profile and the meeting type corresponds to the altitude meeting, said displaying energy deviations comprises displaying the altitude deviation in a display zone for the current altitude of the aircraft and the first distance deviation in a display zone for the lateral path of the aircraft.

12. The aid method according to claim 8, wherein, when:
the energy state of the aircraft corresponds to the state above the reference altitude profile and the meeting type corresponds to the speed meeting; or
the energy state of the aircraft corresponds to the state on the reference altitude profile or below the reference altitude profile and the meeting type corresponds to the speed meeting or the mixed meeting,
then said displaying energy deviations comprises displaying the speed deviation in a display zone for the current speed of the aircraft and the second distance deviation in the display zone for the lateral path of the aircraft.

13. The aid method according to claim 8, wherein, when the energy state of the aircraft corresponds to the state above the reference altitude profile and the meeting type corresponds to the mixed meeting, said displaying energy deviations comprises displaying the altitude deviation in a display zone for the current altitude of the aircraft, the speed deviation in a zone for displaying the current speed of the aircraft and the smallest distance from among the first distance deviation and the second deviation, in a display zone for the lateral path of the aircraft.

14. The aid method according to claim 8, wherein said displaying energy deviations comprises displaying an energy scale of the aircraft, and on this scale, the total energy deviation or the kinetic energy deviation or the potential energy deviation or the total height deviation, and in which said displaying energy deviations comprises displaying the total height deviation on an altitude display scale of the aircraft.

15. The aid method according to claim 1, wherein said displaying energy deviations comprises displaying the high-energy joining profile in a display zone for the vertical path of the aircraft.

16. A non-transitory computer program product comprising software instructions which, when implemented by a piece of computer equipment, carry out the aid method according to claim 1.

17. An aid system for controlling the energy situation of an aircraft, the energy situation being defined by the altitude and the speed of the aircraft, the aid system comprising:
a processor within the aircraft configured to:
determine an energy meeting point corresponding to a point of a flight plan of the aircraft, designated as a constraint point, having an altitude constraint and/or a speed constraint;
based on the determined energy meeting point:
determine a type of meeting based on the constraint at the constraint point, the type of meeting being chosen from the group consisting of altitude meeting, speed meeting and mixed meeting;
determine an energy state of the aircraft relative to a reference altitude profile determined by a flight management system of the aircraft, the energy state being chosen from the group consisting of a state above the reference altitude profile, a state on the reference altitude profile, and a state below the reference altitude profile;
determine a high-energy joining profile representative of a future path of the aircraft with an energy dissipation strategy, the determination being carried out backwards starting substantially from the corresponding altitude constraint and/or the corresponding speed constraint up to the current position of the aircraft, depending on the type of meeting and the energy state of the aircraft; and
determine energy deviations of the aircraft relative to the high-energy joining profile, the energy deviations being indicative of whether or not the aircraft can reach its energy meeting point;
receive the determined energy meeting point or another energy meeting point designated by an operator of the aircraft in case of rejection of the determined energy meeting point from the operator of the aircraft; and
engage the energy dissipation strategy based on the received energy meeting point, by controlling mobile outside devices; and
a display device displaying the energy deviations to a pilot the operator of the aircraft.

18. An aid method for controlling the energy situation of an aircraft, the energy situation being defined by the altitude and the speed of the aircraft, comprising:
determining, by a processor in the aircraft, an energy meeting point corresponding to a point of a flight plan of the aircraft, designated as a constraint point, having an altitude constraint;
based on the determined energy meeting point:
determining, by the processor in the aircraft, an energy state of the aircraft relative to a reference altitude profile determined by a flight management system of the aircraft, the energy state being a state above the reference altitude profile;
determining, by the processor, a high-energy joining profile representative of a future path of the aircraft with an energy dissipation strategy, the determination being carried out backwards substantially from the corresponding altitude constraint to the current position of the aircraft, with a constant engine thrust and with the current speed of the aircraft considered to be constant; and
determining, by the processor in the aircraft, energy deviations of the aircraft relative to the high-energy joining profile, the energy deviations being indicative of whether or not the aircraft can reach its energy meeting point;
displaying, by a display device, the energy deviations to an operator of the aircraft;
receiving the determined energy meeting point or another energy meeting point designated by the operator of the aircraft in case of rejection of the determined energy meeting point by the operator of the aircraft; and
engaging the energy dissipation strategy based on the received energy meeting point, by controlling mobile outside devices.

* * * * *